(12) United States Patent
Irvin

(10) Patent No.: US 6,424,056 B1
(45) Date of Patent: Jul. 23, 2002

(54) KEYLESS ENTRY SYSTEM FOR A VEHICLE

(75) Inventor: David R. Irvin, Raleigh, NC (US)

(73) Assignee: Telefonaktiebolaget (LME), Stockholm (SE)

( * ) Notice: Subject to any disclaimer, the term of this patent is extended or adjusted under 35 U.S.C. 154(b) by 0 days.

(21) Appl. No.: 09/727,044

(22) Filed: Nov. 30, 2000

(51) Int. Cl.[7] .............................................. B60R 25/10
(52) U.S. Cl. ..................... 307/10.1; 307/10.5; 307/10.2
(58) Field of Search .............................. 307/10.1–10.5; 701/49; 340/815.72, 5.2, 5.3–5.33

(56) References Cited

U.S. PATENT DOCUMENTS

| | | | | |
|---|---|---|---|---|
| 5,898,365 A | * | 4/1999 | Niederlein | 340/425.5 |
| 5,945,921 A | * | 8/1999 | Seo et al. | 340/825.69 |
| 6,243,022 B1 | * | 6/2001 | Furukawa | 340/825.72 |
| 6,292,107 B1 | * | 9/2001 | Yamaura et al. | 340/825.69 |

FOREIGN PATENT DOCUMENTS

| | | | | |
|---|---|---|---|---|
| GB | 240418 A | * | 7/1991 | G08C/23/00 |
| JP | 9-125768 | * | 5/1997 | E05B/49/00 |
| JP | 10-94062 | * | 4/1998 | H04Q/9/00 |

* cited by examiner

Primary Examiner—Fritz Fleming
(74) Attorney, Agent, or Firm—Coats & Bennett, P.L.L.C.

(57) ABSTRACT

A keyless entry system for a vehicle comprises a portable remote unit and a vehicle-mounted base unit supporting two-way communications. The remote unit includes a first transceiver and a control and is operative to transmit a command signal to the base unit in response to actuation of the control by a user. The base unit comprises a second transceiver and a control circuit, which controls a function in a vehicle. The base unit outputs control signals to control a vehicle function in response to receipt of commands from the remote unit. The base unit also transmits an acknowledgement signal to the remote unit responsive to the command signal.

18 Claims, 5 Drawing Sheets

KEYLESS ENTRY SYSTEM FOR A VEHICLE

BACKGROUND OF THE INVENTION

The present invention relates generally to keyless entry systems for vehicles and, more particularly, to a protocol for a keyless entry system to provide status information to the user.

Keyless entry systems for vehicles allow users to lock or unlock the doors of a vehicle without a key. Keyless entry systems typically take the form of a pocket-sized fob with several push buttons that lock and unlock doors and perform other functions through encoded RF signals transmitted to a vehicle-installed receiver. Keyless entry systems are a great convenience to users. With a keyless entry system, a user, whose hands are burdened, can easily lock or unlock the doors of a vehicle. Keyless entry systems also allow a user to ensure that the doors are locked as the user walks away from the vehicle, and to escape harm by unlocking the doors quickly to gain entry into the vehicle when confronted by an assailant or otherwise threatened. Some keyless entry systems allow the user to activate an alarm and transmit a call for help. Further, keyless entry systems enable the user to locate a vehicle in a crowded parking lot by unlocking and relocking the doors, thereby causing the vehicle to sound its horn or flash its lights. Because of the many benefits, keyless entry systems have become standard equipment on many new vehicles.

Despite their many benefits, prior art keyless entry systems suffer from a number of limitations. One limitation is the range of the transmitter, which is limited by the requirements for miniaturization of the transmitter and the low capacity of its battery. Another limitation is the manner in which the keyless entry systems signal completion of a task. Many of today's keyless entry systems rely on the vehicle's horn or lights to signal completion of a task, such as locking of the doors. In certain instances, the sounding of the vehicle's horn or flashing of the vehicle's lights may attract unwanted attention. In other cases, the keyless entry system may not provide effective feedback, or may not provide any feedback at all. For example, a user who commands the vehicle to unlock its door often does not know until reaching the vehicle whether the task has been completed. Similarly, a user may signal the vehicle to lock its doors as the user is walking away from the vehicle. If for some reason the vehicle is unable to complete the task, an inattentive user may not be aware of the problem.

BRIEF SUMMARY OF THE INVENTION

The present invention relates to a keyless entry system for a vehicle that allows two-way communication between a vehicle-mounted base unit and a portable remote unit. The portable remote unit comprises a first transceiver and a control. The transceiver in the remote unit transmits user commands to the vehicle-mounted base unit in response to actuation of the control by the user. After sending a user command to the base unit in the vehicle, the remote unit waits for an acknowledgement signal from the base unit in the vehicle. The acknowledgement signal may, for example, indicate successful receipt by the base unit of the user command or may indicate that a function or task was successfully completed. The remote unit may further include an indicator or display that informs the user that the function or task was successfully completed. In one embodiment of the invention, the acknowledgement signal may contain status information from the vehicle's control center, which can be viewed by the user on an LCD display built into the remote unit.

In another aspect of the invention, user commands are transmitted at two distinct power levels. The remote unit initially transmits user commands at a low power level. If an acknowledgement is timely received, the process ends. However, if the acknowledgement is not timely received, the remote unit re-transmits the user command at a higher power level. Thus, the present invention conserves power by transmitting at the lower power level the majority of the time and switching to the higher power level only in those instances when the lower power level is insufficient.

In another aspect of the invention, the available user commands that can be acted upon by the base unit may be divided into classes, with each class including one or more user commands. The power level of the initial transmission of the user command from the remote unit to the base unit may be determined by the class to which the user command is assigned. For example, user commands may be divided into two classes, one class that represents commands initially transmitted at a low power level and one class that represents commands that are always transmitted at a higher power level. This concept of separating user commands into classes can be extended to three or more classes.

DETAILED DESCRIPTION OF THE INVENTION

Figure 1:
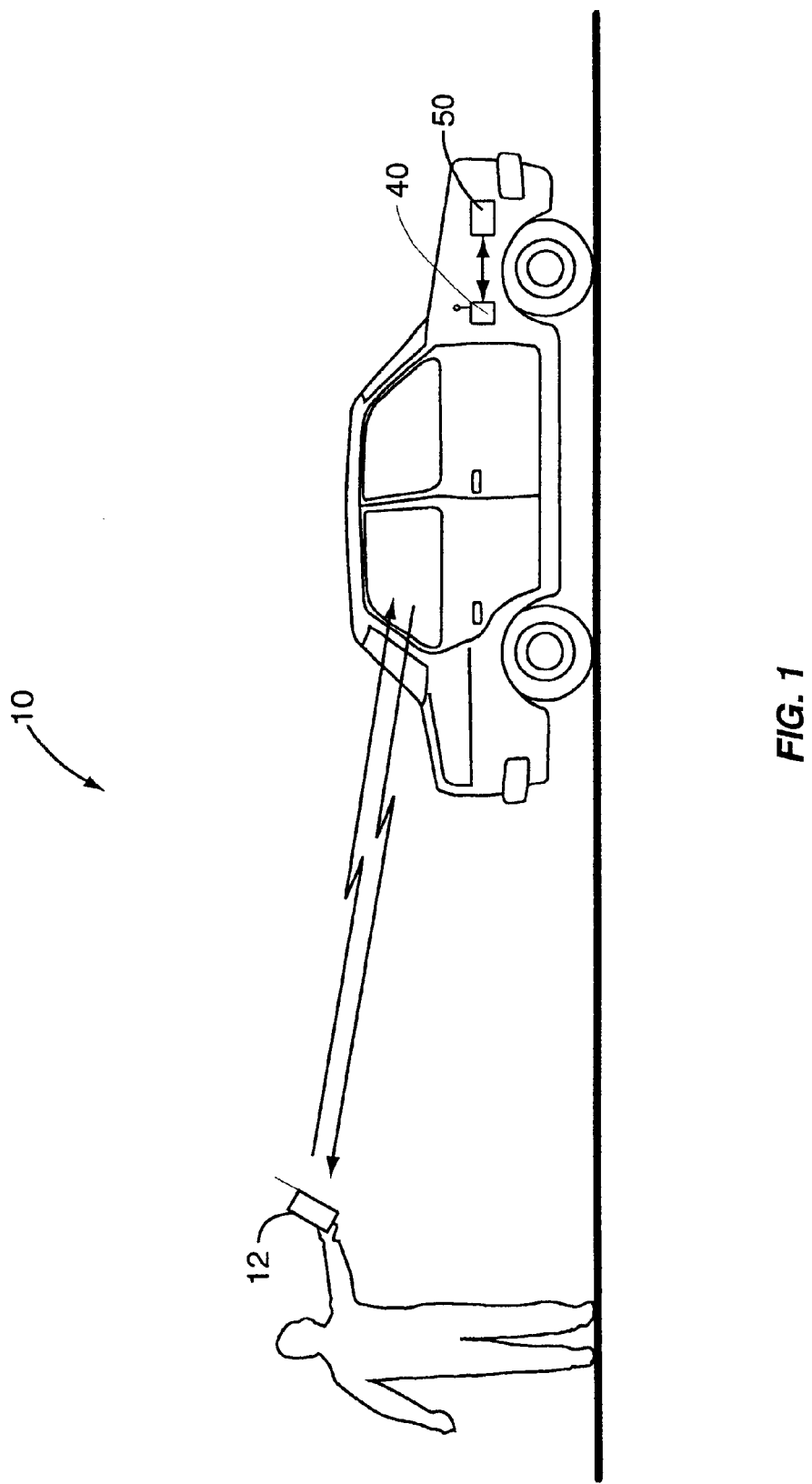
FIG. 1 is an illustration of the keyless entry system of the present invention showing the vehicle-mounted base unit and the portable remote unit.

Referring now to the drawings, FIG. 1 illustrates a remote keyless entry system, denoted generally by the numeral 10. The keyless entry system 10 comprises a portable remote unit 12 and a vehicle-mounted base unit 40. Remote unit 12 transmits command signals containing user commands to the base unit 40. Base unit 40 translates the user commands into output control signals. Base unit 40 interfaces with a vehicle function 50 or vehicle control center. The vehicle function 50 is responsive to the output control signals from the base unit 40 to perform a function, such as locking or unlocking the vehicle's doors, activating an alarm, or turning on/off the vehicle's lights. Base unit 40 further transmits an acknowledgement signal to the remote unit 12 acknowledging receipt by the base unit 40 of command signals from the remote unit. The acknowledgement signal may include status information or alert information concerning the vehicle or a vehicle function. For example, the status information may indicate that a task or function subject to a command was successfully completed. As another example, the status information may indicate a problem, such as the lights being left on or a door left unlocked, that needs the user's attention.

Figure 2:
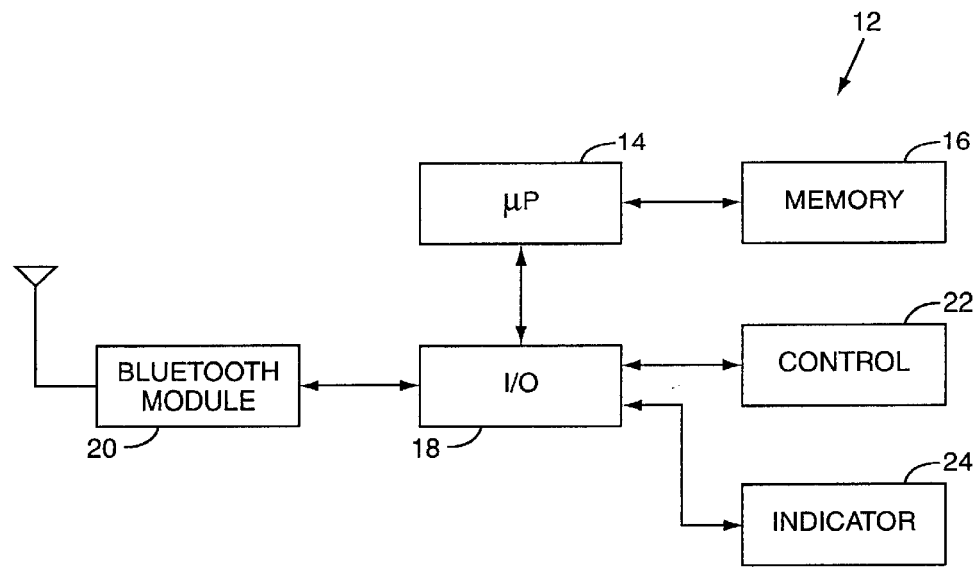
FIG. 2 is a functional block diagram of the portable remote unit.

FIG. 2 is a functional block diagram of a relatively simple remote unit 12 according to one embodiment of the invention. Remote unit 12 comprises a microprocessor 14, memory 16, input/output circuits 18, Bluetooth module 20, control 22, and indicator 24. Microprocessor 14 controls the operation of the remote unit 12 according to programs stored in memory 16. Memory 16 may further store data needed by the microprocessor 14 to carry out its functions. Microprocessor 14 communicates via I/O circuit 18 with Bluetooth module 20, control 22, and indicator 24.

Bluetooth module 20 is a universal radio interface that enables portable electronic devices to connect and communicate wirelessly. Bluetooth module 20 comprises an RF transceiver operating in the 2.45 gigahertz frequency band and control processor that implements the communication protocols specified by the standard known as the Bluetooth standard. Since Bluetooth modules 20 are well known in the art and are readily commercially available, further description of the Bluetooth module 20 is omitted herein. However, it is noted here that the Bluetooth standard supports two distinct transmit power levels, a feature which is relevant to the present invention. More detailed information concerning the Bluetooth standard is contained in "Specification of the Bluetooth System—CORE," Version 1.0b, dated Dec. 1, 1999. A more concise description of the Bluetooth standard is contained in "Bluetooth—The Universal Radio Interface for Adhoc, Wireless Connectivity" by Jaap Haartsen, published in Ericsson Review, No. 3, 1998. Both of these references are incorporated herein by reference.

Control 22 provides means for the user to assert commands to control a function within the vehicle. Control 22 may be as simple as a single push button for controlling a single function within the vehicle, such as locking or unlocking the vehicle's door. Multiple push buttons could be provided to control multiple functions. Control 22 could also comprise a keypad and display that allows a user to select functions from a menu of choices displayed to the user on the display. Forms of controls other than push buttons could also be used. For example, control 22 may be voice-activated or may comprise a pressure sensitive input device, such as a touch pad. Virtually any type of input device could be used as a control 22 and, therefore, the examples given above should not be construed as limiting.

Indicator 24 may, for example, comprise a tone generator, light, or voice synthesizer that conveys status information to the user. An LCD display could also be used as an indicator 24 to display status information in textual or graphic form for viewing by the user. As will be further explained below, one function of the indicator 24 is to indicate to the user when a task or function that is the subject of an outstanding user command has been completed. Indicator 24 could also be used to indicate other status information to the user, or to provide alerts to the user, such as when someone is tampering with the vehicle.

Figure 3:
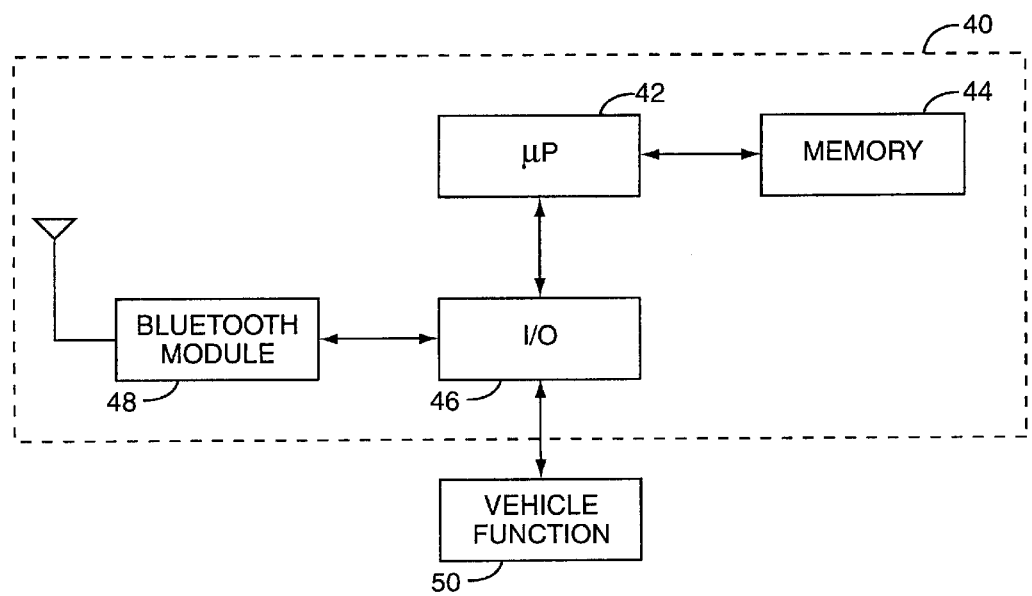
FIG. 3 is a functional block diagram of the vehicle-mounted base unit.

FIG. 3 illustrates one exemplary embodiment of the base unit 40. Base unit 40 comprises a microprocessor 42, memory 44, input/output circuits 46, and Bluetooth module 48. Microprocessor 42 controls the operation of the base unit 40 according to programs stored in memory 44. Memory 44 may further store data needed by the microprocessor 42 to carry out its functions. Microprocessor 42 also functions as a control circuit. It processes user commands received from the remote unit 12 and outputs control signals via I/O circuit 46 to a vehicle function 50 to carry out those user commands.

Bluetooth module 48 is the counterpart of Bluetooth module 20 in the remote unit 12. Bluetooth module 48 enables the base unit 40 to communicate with the remote unit 12 employing the Bluetooth interface protocol.

Figure 4:
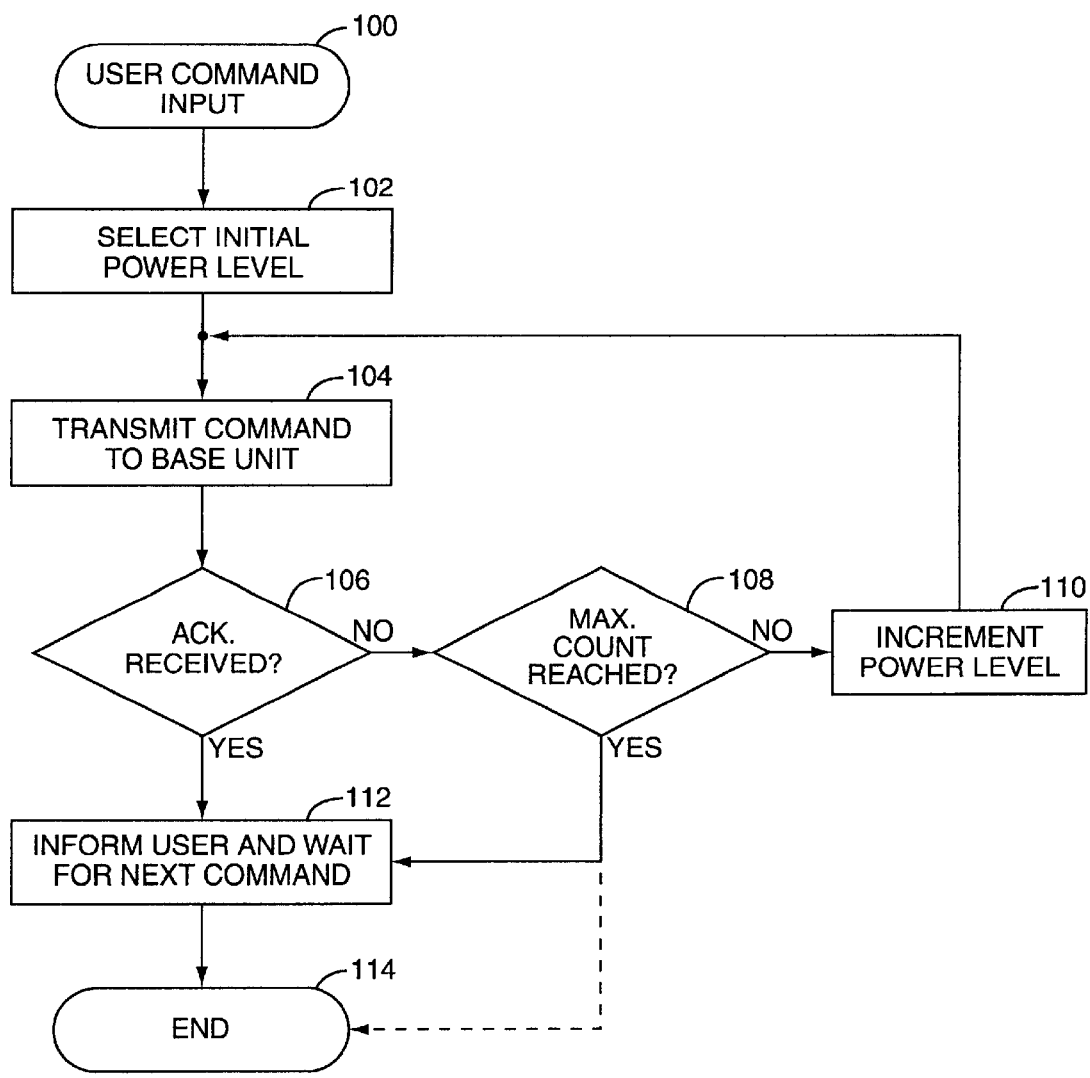
FIG. 4 is a flow chart illustrating the operation of the remote unit.

FIG. 4 shows an exemplary procedure used by remote unit 12. The procedure shown in FIG. 4 is triggered when a user command is input (block 100). In response to the input of a command by the user, the remote unit 12 selects an initial transmit power level (block 102) based on the command input by the user. The user commands may be grouped into classes that determine the initial transmit power level for the commands. Information concerning available user commands and classes may be stored in memory 16. Since the Bluetooth specification employs two transmit power levels, the user commands in the exemplary embodiment are divided into two distinct power classes. Those skilled in the art will recognize that the Bluetooth specification could be modified to allow more transmit power levels, or that other communication protocols allowing a higher number of power levels could be used to practice the invention.

After selecting the initial power level (block 102), the remote unit 12 transmits the user command to the base unit 40 at the selected power level (block 104). The remote unit 12 then waits, usually a predetermined period of time, for an acknowledgement signal from the base unit 40 (block 106). If the acknowledgement signal is not received after the predetermined period of time, the remote unit 12 determines whether a predetermined number of attempts, referred to as MAX COUNT, has been reached (block 108). MAX COUNT can be programmed by the manufacturer, or may be selected by the user and stored in memory 16. If the number of attempts to transmit the user command is less than MAX COUNT, the remote unit 12 increments the power level (block 110) and repeats the transmission of the user command to the base unit (block 104). The remote unit 12 will continue re-transmitting the user command (block 104) until an acknowledgement is received or MAX COUNT is reached. It is to be noted that the remote unit 12 increments the power level in block 110 after each transmission until the maximum power level is reached. After the maximum power level is reached, all subsequent re-transmissions are at the maximum power level.

If the remote unit 12 receives an acknowledgement signal responsive to a transmitted user command, the remote unit activates indicator 24 to inform the user that the acknowledgement signal was received (block 112). Such indication can be made by generating an audible tone, turning on a light, synthesizing speech, or outputting text or graphics to a display device. In the latter case, the display could further display status information contained in the acknowledgement signal.

If MAX COUNT is reached before an acknowledgement signal is received by the remote unit 12, the indicator 24 may be activated to notify the user that no acknowledgement was received. The failure to receive an acknowledgement after a predetermined number of attempts to transmit a user command may indicate that the user command was not carried out and the user can then act accordingly as circumstances dictate. Alternately, the remote unit 12 could terminate the procedure (block 114) without activating the indicator 24. In this case, the lack of an indication serves as notice to the user that the transmitted user command was not received by the base unit 40.

Figure 5:
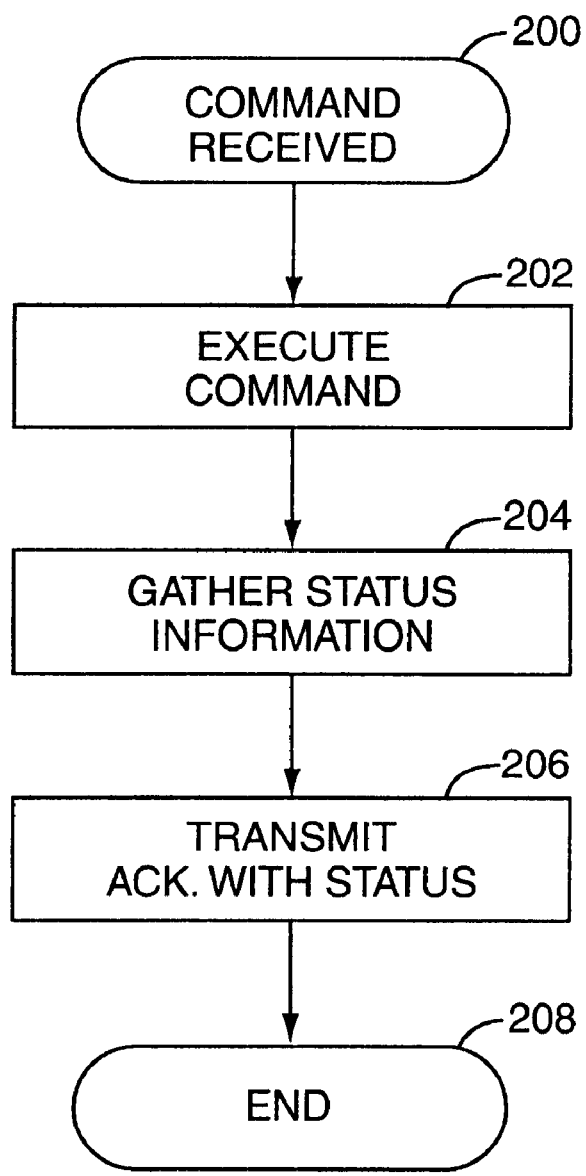
FIG. 5 is a flow chart illustrating the operation of the base unit.

FIG. 5 illustrates an exemplary procedure executed by base unit 40. The procedure begins when a user command is received at the base unit 40 (block 200). The user command may, for example, comprise a command to lock or unlock the doors of the vehicle, activate or deactivate the vehicle's alarm, or to turn on/off the vehicle's lights. Upon receiving the user command, the base unit 40 executes the command (block 202). The user command is executed by outputting a control signal to a vehicle function 50 or vehicle control center. The base unit 40 may then optionally gather status information (block 204). The status information may indicate successful execution of the user command or may provide general status information about the vehicle (e.g., window rolled down, lights on, door ajar, etc.). After executing the user command (block 202) and gathering status information (block 204), the base unit 40 transmits an acknowledgement signal back to the remote unit 12 (block 206). The acknowledgement signal may contain the status information gathered in step 204. Depending upon the implementation, the acknowledgement signal may simply indicate receipt by the base unit 40 of the user command. In other implementations, the acknowledgement could be transmitted only when an indication is received by the base unit 40 from the vehicle function 50 that the user command was successfully executed.

Figure 6:
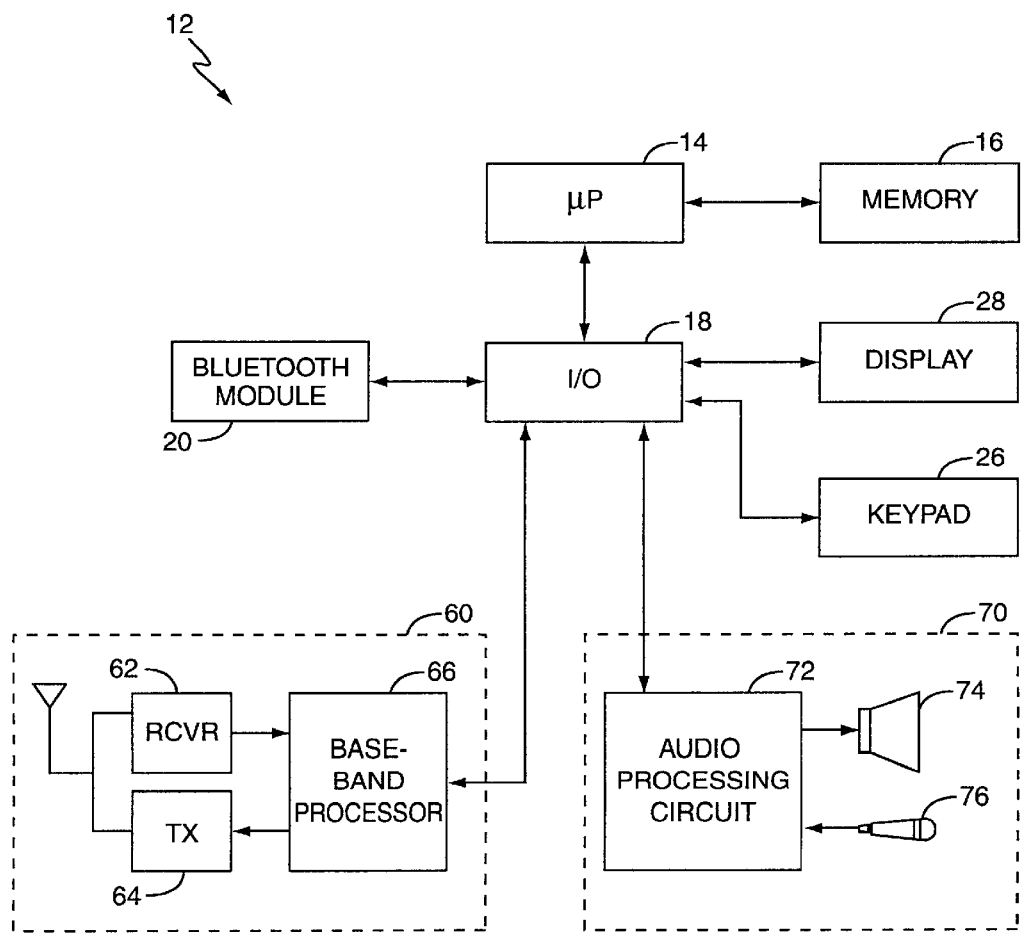
FIG. 6 shows an alternate embodiment of a remote unit incorporated into a cellular radiotelephone.

FIG. 6 illustrates an alternate embodiment of the remote unit 12. The remote unit 12 of FIG. 6 is similar to the remote unit 12 of FIG. 2 and, therefore, similar reference numbers have been used in those Figures to indicate similar parts. The remote unit 12 of FIG. 1 includes, in addition to those elements previously described in connection with FIG. 2, a cellular radio transceiver 60 and an audio section 70. The cellular radiotelephone transceiver 60 comprises an RF section including a receiver 62 and transmitter 64. The cellular radiotelephone transceiver 60 further includes a baseband processing circuit 66 for processing signals received by and transmitted from the cellular radiotelephone transceiver 60. Receiver 62 performs frequency down conversion, sampling, and A-to-D conversion of received signals. Transmitter 64 performs digital-to-analog conversion, modulation, and amplification of transmitted signals. Baseband processing circuit 66 performs digital signal processing, such as channel coding, source coding, and encryption.

Audio section 70 comprises audio processing circuit 72, speaker 74, and microphone 76. Audio processing circuits 72 code speech signals input via microphone 76 and decode speech signals received by receiver 62, which are then output to speaker 74. Audio processing circuit 72 may also include a tone generator to generate audible tones that are output to speaker 74. The tone generator and speaker 74 thus may perform the function of the indicator 24 in the first embodiment.

The microprocessor 14, in addition to the functions previously described, implements the communication protocols used by the cellular radiotelephone transceiver 60. The cellular radiotelephone transceiver 60 may use a variety of different communication protocols, including Time Division Multiple Access (TDMA) communication protocols and Code Division Multiple Access (CDMA) communication protocols. There are several standards organizations which publish communication protocols, including the Telecommunications Industry Association (TIA), the Electronics Industry Association (EIA), and the European Telecommunications Standards Institute (ETSI). Standards published by these organizations include the TIA/EIA-136, IS-54, and IS-95 standards published by the Telecommunications Industry Institute and Electronics Industry Association. The Global Standard for Mobile Communications (GSM) Standard and Wideband CDMA (W-CDMA) standards are published by the Electronic Telecommunications Standards Institute.

The remote unit 12 of FIG. 6 further includes a user interface including a keypad 26 and display 28. The keypad 26 allows the user to enter commands, respond to prompts, and dial digits to initiate calls. The function of the control 22 of the embodiment in FIG. 2 is performed by the keypad 26. The display 28 allows the user to view the called number, status information, and user prompts. Display 28 also allows the user to view status information and may serve the function of an indicator 24.

The embodiment of the remote unit 12 combines the functions of a cellular radiotelephone and keyless entry system into a single package that is convenient for the user. Other functions could also be combined with the keyless entry function. For example, the remote unit 12 could take the form of a personal digital assistant that combines a cellular radiotelephone, processing capabilities, and keyless entry functions The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A keyless entry system for a vehicle, comprising:

a remote unit including a first transceiver and a control, said remote unit operative to transmit a command signal containing a user command in response to actuation of said control by a user;

a vehicle-mounted base unit comprising a second transceiver to receive said command signals from said remote unit and a control circuit to control a function in said vehicle in response to said user command, said second transceiver further operative to transmit an acknowledgement signal to said remote unit responsive to said command signal; and wherein said remote unit is further operative to re-transmit said command signal after a predetermined time period if an acknowledgement from said base unit is not received.

2. The keyless entry system according to claim 1 wherein the re-transmitted command signal is transmitted at a higher power level than the originally-transmitted command signal.

3. The keyless entry system according to claim 1 wherein said remote unit further comprises an indicator to notify said user when said acknowledgement signal is received by said remote unit.

4. A remote unit for a keyless entry system, comprising:

a control actuated by a user;

a transceiver to communicate with a base unit mounted in a vehicle, said transceiver operative to transmit command signals to said base unit in response to actuation of said control by a user and to receive acknowledgement signals responsive to said command signals from said base unit; and said remote unit further operative to re-transmit said command signal after a predetermined time period if an acknowledgement from said base unit is not received.

5. The remote unit according to claim 4 further comprising an indicator to notify said user when said acknowledgement signal is received by said remote unit.

6. The remote unit according to claim 4 wherein the re-transmitted command signal is transmitted at a higher power level than the originally-transmitted command signal.

7. A method of remotely controlling a function in a vehicle, comprising:
actuating a control on a remote unit by a user;
transmitting a command signal containing a user command from said remote unit to a base unit mounted in said vehicle in response to the actuation of said control;
executing said user command in said base unit by generating a control signal to control a function in said vehicle;
transmitting an acknowledgement signal responsive to said user command from said base unit to said base unit; and
re-transmitting said command signal from said remote unit to said base unit if said acknowledgement signal is not received from said base unit within a predetermined time period.

8. The method according to claim 7 wherein re-transmitting said command signal comprises re-transmitting said command signal at an increased power level.

9. A method for controlling a user function in a vehicle, comprising:
transmitting a command signal from a portable remote unit to a base unit mounted in said vehicle;
waiting, by said portable remote unit, a predetermined time period for an acknowledgement signal from said base unit; and
automatically re-transmitting said command signal from said portable remote unit to said base unit if an acknowledgement signal is not received within said predetermined time period.

10. The method according to claim 9 wherein re-transmitting said control signal comprises re-transmitting said control signal a predetermined number of times.

11. The method according to claim 10 wherein re-transmitting said command signal comprises re-transmitting said command signal at an increased power level.

12. A method of remotely controlling a plurality of vehicle functions, said method comprising:
grouping a plurality of user commands corresponding to said plurality of vehicle functions into two or more groups, each group having an associated initial transmit power level;
transmitting a selected user command from a remote unit to a base unit located in said vehicle, wherein said user command is initially transmitted at one of said initial transmit power levels associated with the group corresponding to the selected user command; and
re-transmitting said user command from said remote unit to said base unit if an acknowledgement signal is not received from said base unit within a predetermined time period.

13. The method according to claim 12 further comprising increasing the transmit power level if an acknowledgement signal is not received from the base unit.

14. A keyless entry system for a vehicle, comprising:
a remote unit including a first transceiver and a control, said remote unit operative to:
transmit a command signal containing a user command to a base unit in response to actuation of said control by a user;
re-transmit said command signal if an acknowledgement signal is not received from said base unit after a predetermined time period has elapsed; and
a vehicle-mounted base unit comprising a second transceiver to receive said command signals from said remote unit and a control circuit to control a function in said vehicle in response to said user command, said second transceiver further operative to transmit an acknowledgement signal to said remote unit responsive to said command signal.

15. The keyless entry system according to claim 14 wherein said remote unit further comprises an indicator to notify said user when said acknowledgement signal is received by said remote unit.

16. The keyless entry system according to claim 14 wherein first transceiver in said remote unit is operative to transmit said control signal at a first predetermined power level during a first transmission and to transmit said control signal at a second predetermined power level higher than said first predetermined power level in a subsequent transmission.

17. A remote unit for a keyless entry system, said remote unit comprising:
a control actuated by a user; and
a transceiver operatively connected to said control and operative to transmit a command signal to a base unit mounted in a vehicle in response to actuation of said control by a user and to receive an acknowledgement signal from said base unit responsive to said command signal, said transceiver further operative to re-transmit said command signal a predetermined number of times until an acknowledgement signal is received.

18. The remote unit according to claim 13 wherein first transceiver in said remote unit is operative to transmit said control signal at a first predetermined power level during a first transmission and to transmit said control signal at a second predetermined power level higher than said first predetermined power level in a subsequent transmission.

* * * * *